(No Model.) 2 Sheets—Sheet 1.

S. F. LEAKE.
SLOT CLOSER FOR RAILWAYS.

No. 414,227. Patented Nov. 5, 1889.

WITNESSES:

INVENTOR,
Saml F. Leake
By S. J. Van Stavorn
ATTORNEY (No Model.) 2 Sheets—Sheet 2.
S. F. LEAKE.
SLOT CLOSER FOR RAILWAYS.
No. 414,227. Patented Nov. 5, 1889.
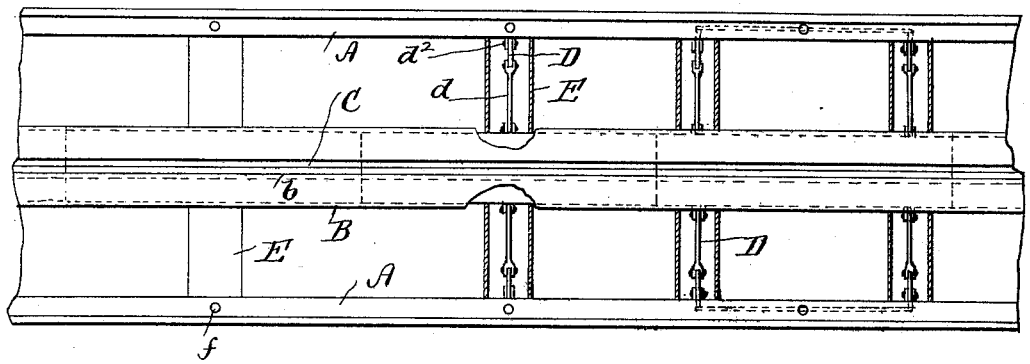
Fig. 5
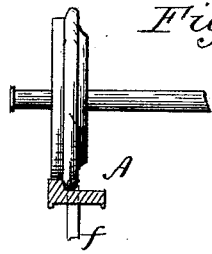
Fig. 6
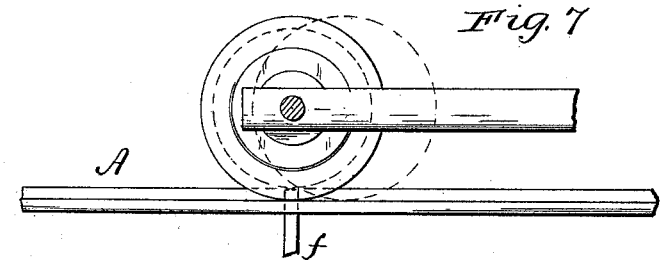
Fig. 7
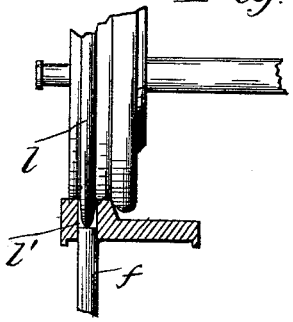
Fig. 8
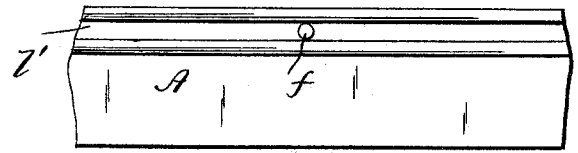
Fig. 9
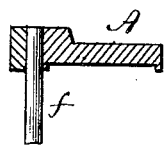
Fig. 10
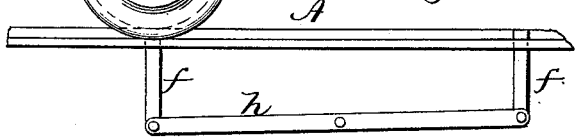
Fig. 11
Fig. 12
WITNESSES:
Geo. R. Byington
H. B. Hyatt
INVENTOR,
Saml. F. Leake
By S. J. Van Stavoren
ATTORNEY

UNITED STATES PATENT OFFICE.

SAMUEL F. LEAKE, OF PHILADELPHIA, PENNSYLVANIA.

SLOT-CLOSER FOR RAILWAYS.

SPECIFICATION forming part of Letters Patent No. 414,227, dated November 5, 1889.

Application filed April 2, 1889. Serial No. 305,789. (No model.)

*To all whom it may concern:*

Be it known that I, SAMUEL F. LEAKE, a citizen of the United States, residing at Philadelphia, in the county of Philadelphia and State of Pennsylvania, have invented certain new and useful Improvements in Pneumatic Railways, of which the following is a specification.

My invention has relation to pneumatic or cable railways, comprising a line of railway-tracks, a line of slotted conduit, a traveling piston in said conduit actuated by air pressure or exhaust, a piston-bar extending up through the conduit-slot and connected with the car-body, or with one of its trucks or axles, and movable slides or valves for sealing the conduit-slot, which slides or valves are alternately opened in advance of said piston-bar and closed to the rear of the same after passing the valves or slides, in order to admit of the travel of the car and to prevent the escape of the motive power from the conduit.

My invention has for its object to provide the movable slides or valves for sealing the conduit-slot with lever or other actuating mechanism which is operated by the wheels of the car to effect an alternate opening and closing of the valves on the conduit-slot.

My invention accordingly consists of the combinations, constructions, and arrangements of parts, as hereinafter more particularly described in the specification, and pointed out in the claims, reference being had to the accompanying drawings, wherein—

Figure 1:
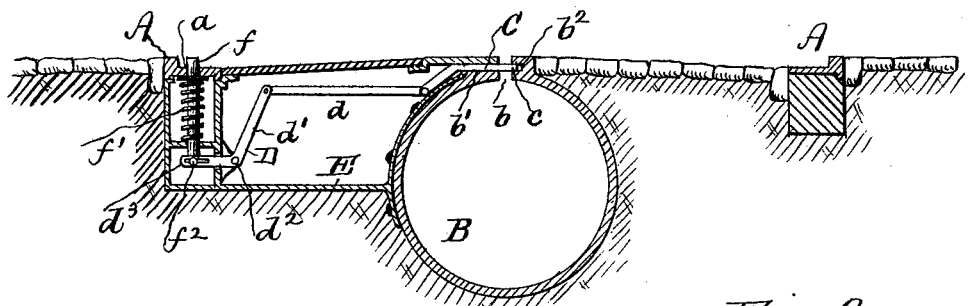
Figure 2:
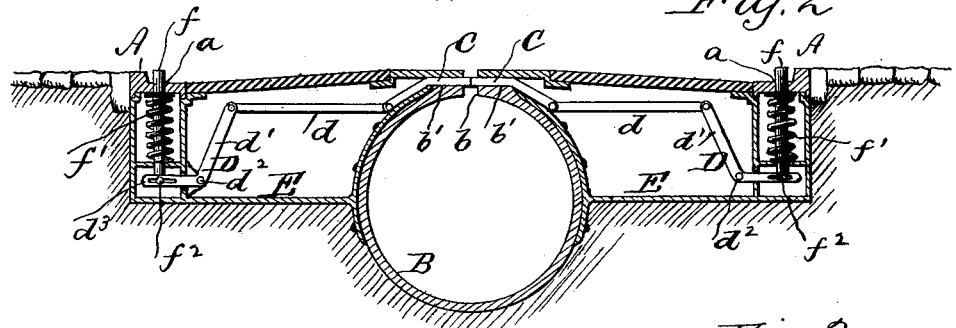
Figure 3:
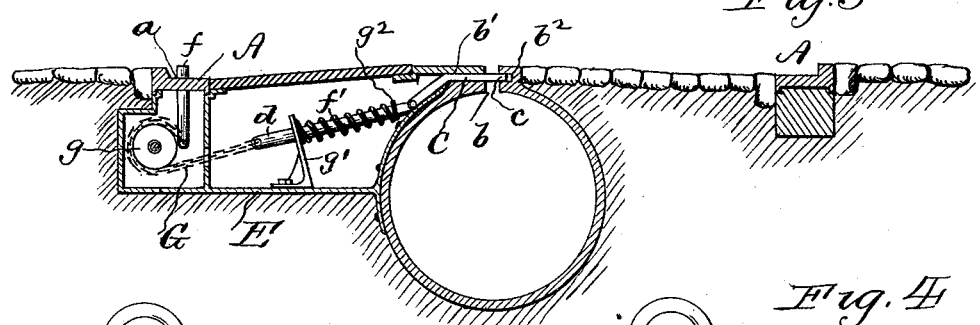
Figure 4:
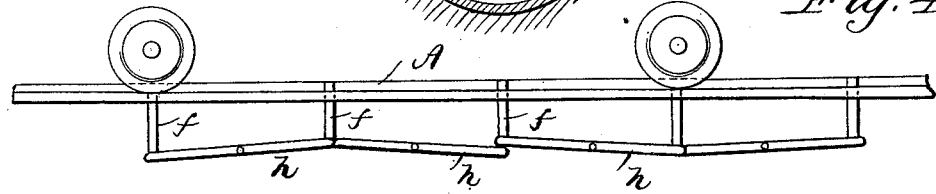

Figure 1 is a transverse section of a street-railway, showing slotted conduit-valves and actuating mechanism therefor embodying my improvements. Fig. 2 is a similar view showing the valves in two lengthwise sections and separate actuating mechanism for each section. Fig. 3 is a like view showing modified form of valve-actuating mechanism. Fig. 4 is an elevation showing modification of controlling mechanism for the actuating devices for the conduit-slot valves. Fig. 5 is a plan of a section of a line of railway, partly in section, embodying my improvements, and showing the form of valves and actuating mechanism indicated in Fig. 2. Fig. 6 is a sectional elevation of wheel, track-rail, and controlling mechanism for the valve-actuating devices. Fig. 7 is a sectional side elevation showing the same and part of a truck for the car. Fig. 8 is a sectional elevation similar to Fig. 6, showing modified form of wheel and location of controlling mechanism for the valve-actuating devices. Fig. 9 is a plan of the rail shown in Fig. 8. Fig. 10 is a sectional elevation showing said rail and the said controlling mechanism in its normal position when conduit-slot valve is closed. Fig. 11 is a side elevation showing rail, wheel, and modified form of controlling mechanism for the valve-actuating devices; and Fig. 12 is a sectional elevation showing still another modification of the same.

A represents a line of railway-tracks; B, a line of conduit for a pneumatically-actuated piston or a traveling or other motive cable, neither of which are shown in the drawings, as they form no part of my present improvements. The conduit B has the usual slot $b$, and, as shown in the drawings, the sides of the slot project above the conduit proper and are longitudinally slotted, as at $b'$, to form seats or bearings for slides or valves C for closing said slot. The valves C are of some length, the extent of which may be varied as desired, and they may be in one piece from side to side and end to end, as shown in Fig. 1, in which case the valve extends through recess or slot $b'$ in only one of the sides of the slot, and the side edge $c$ of the valve enters a groove $b^2$ in the opposite side of the slot to seal the same. At or near the transverse middle or near each end of the valve, as shown more plainly in Fig. 5, the valves C have a link-connection $d$ with one arm $d'$ of a bell-crank lever D, suitably pivoted at $d^2$ to box E, extending laterally from the conduit B to the rails or their longitudinal sleeper.

In the outer ends of the boxes E are supported vertically-sliding rods $f$, which project upwardly through openings $a$ in the rails, so as to be above the surface of the same in line with the car-wheels, and said rods $f$ have upwardly-acting pressure-springs $f'$ for maintaining the same in their normal position, as shown in Figs. 1 and 2. The rods $f$ have connection $f^2$ with the slotted arms $d^3$ of the bell-crank lever D, so that a downward movement of the rods $f$ by a car-wheel passing over and depressing their upper ends vibrates levers D to slide the valves C toward the rail or away from the conduit to open its slot, and an upward movement of rods $f$, produced by the reaction of springs $f'$, reversely vibrates levers D to correspondingly slide the valves over to and close the conduit-slot, which is their normal position.

The described movement of the rods $f$ to open valves C occurs whenever the forward wheel on the car meets and rides over the bars $f$, depressing each in turn to successively open the valve C in front of the piston or other bar traveling in the slot of the conduit, said bar holding said valves open until it passes by the same, whereupon the reaction of the springs $f'$ returns the bar $f$ and the valve-actuating mechanism to their normal position to close the valves upon the conduit slot. It will be seen, therefore, that the piston or other bar can travel in the conduit-slot, and the latter is kept sealed to prevent the escape of the air or exhaust power in the conduit when the same is used as motive agent.

In Fig. 2 the valves C are shown composed of two longitudinal sections which meet in the middle of the conduit-slot, and each section is provided with actuating mechanism of a similar construction to that above described.

In Fig. 3, and also in Fig. 12, the bell-crank lever D is dispensed with, and a chain or link connection G, passing over a pulley $g$ in box E, attaches the rod $f$ to the link $d$, which slides in guides $g'$, secured in box E, and said links are provided with collars $g^2$, between which and the guides $g'$ is placed the reaction-springs $f'$, instead of being on the rods $f$.

In Fig. 4 the rods $f$ contact with pivoted levers $h$, longitudinally arranged, as shown, so that their ends will be in the path of successive rods $f$, and will so connect with the links $d$, or either, by the chains G or bell-crank levers D, as above described, to effect the opening and closing of valves C, (see also Fig. 11,) and by suitably arranging the successive rods $f$ on different sides of the tracks or out of line with each other, as set forth in another pending application filed by me, the forward car-wheels serve to open the valves C from the conduit-slot and the rear wheels to close the valves thereon.

The rods $f$ may project up through the flanges of the rail, as shown in Figs. 1, 2, and 6, in order to be depressed by the flange of the wheel, or said rods may project up through slots in the tread of the rail, as indicated in Figs. 10 and 11, to admit of the tread of the wheel depressing said rods $f$. If desired, however, the tread of the wheel may be provided with a flange $l$ to depress the rods $f$ when they project through the tread of the rail, in which case the latter has a continuous longitudinal groove $l'$ formed in it. (See Figs. 8 and 9.)

The improvements herein described are applicable to street, steam, or elevated roads, as desired, and when used upon surface roads the various parts are so arranged that they are level or flush with the surface of the street, in order not to interfere with the usual vehicle traffic.

As the construction and arrangement of the novel features of my invention may be varied without departing from the spirit of the same, I do not limit myself to the construction and arrangement as shown and described.

What I claim is—

1. The combination, with a line of railway-tracks, of a car, a slotted conduit, movable valves for the conduit-slot, and actuating mechanism for said valves controlled by the car-wheels, substantially as set forth.

2. The combination, with a line of railway-tracks, of a car, a slotted conduit, movable valves for the conduit-slot, and mechanism interposed between the valves and the rails and operated by the car-wheels to open the valves, substantially as set forth.

3. The combination, with a line of railway-tracks, of a car, a slotted conduit, valves C, closing the conduit, and actuating mechanism leading to the track-rails and operated by the car-wheels to open the valves, and a reacting spring to close said valves, substantially as set forth.

4. The combination, with a slotted conduit, of valves C, boxes E, bars $f$ in and projecting from said boxes, and actuating mechanism between bars $f$ and valves C, substantially as and for the purpose set forth.

5. The combination, with a slotted conduit, of valves C, boxes E, bars $f$ in and projecting from said boxes, actuating mechanism between bars $f$ and valves C, and reacting spring on said actuating mechanism, substantially as set forth.

In testimony whereof I affix my signature in presence of two witnesses.

SAMUEL F. LEAKE.

Witnesses:
S. J. VAN STAVOREN,
CHAS. F. VAN HORN.